May 7, 1935.                F. A. BEATTY                 2,000,314
                            UP-CUT SHEAR
                        Filed Jan. 21, 1931           3 Sheets-Sheet 1

INVENTOR
Floyd A. Beatty
by
Byrnes, Stebbins, Parmelee & Blenko
his attorneys

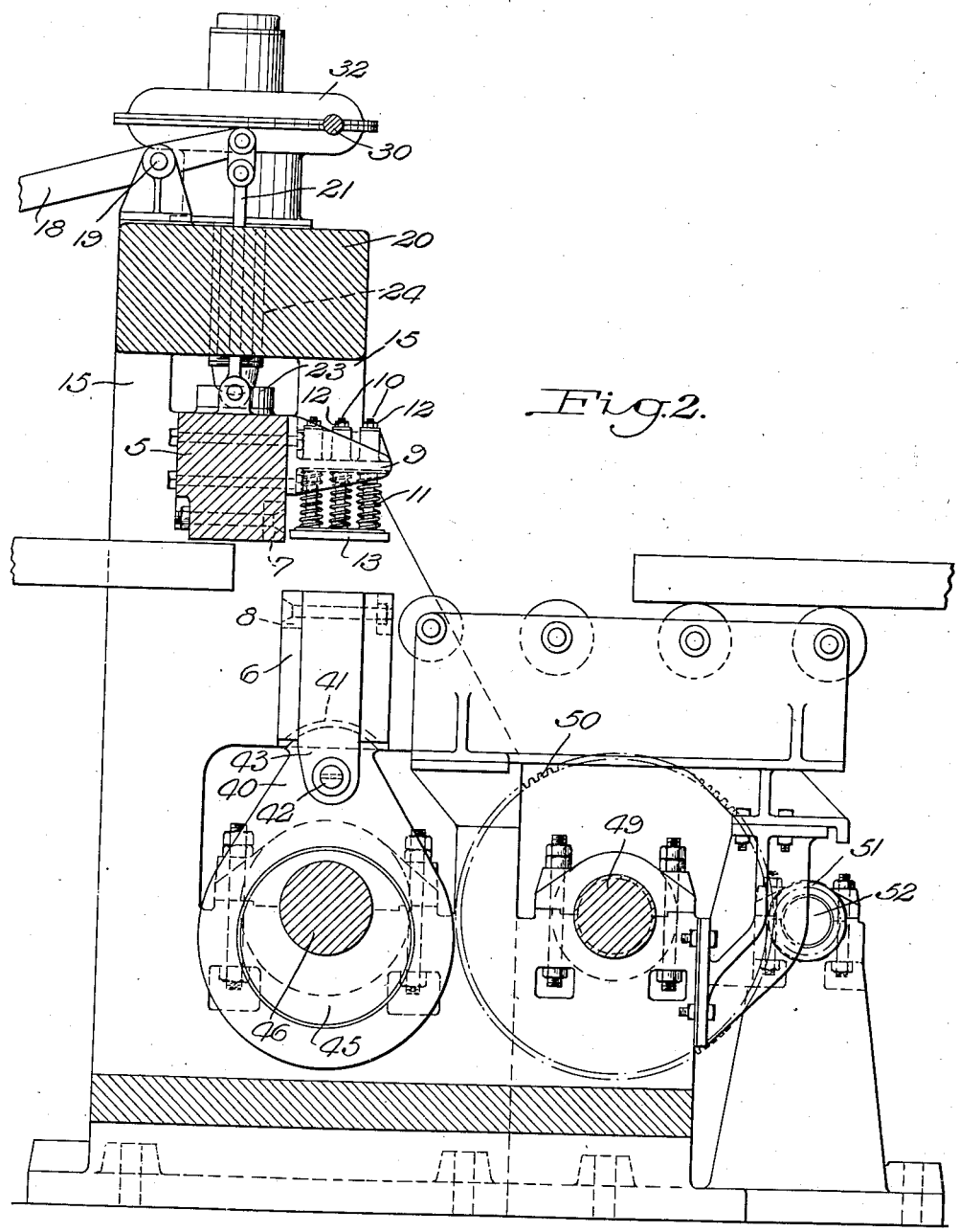

May 7, 1935.  F. A. BEATTY  2,000,314
UP-CUT SHEAR
Filed Jan. 21, 1931  3 Sheets-Sheet 3
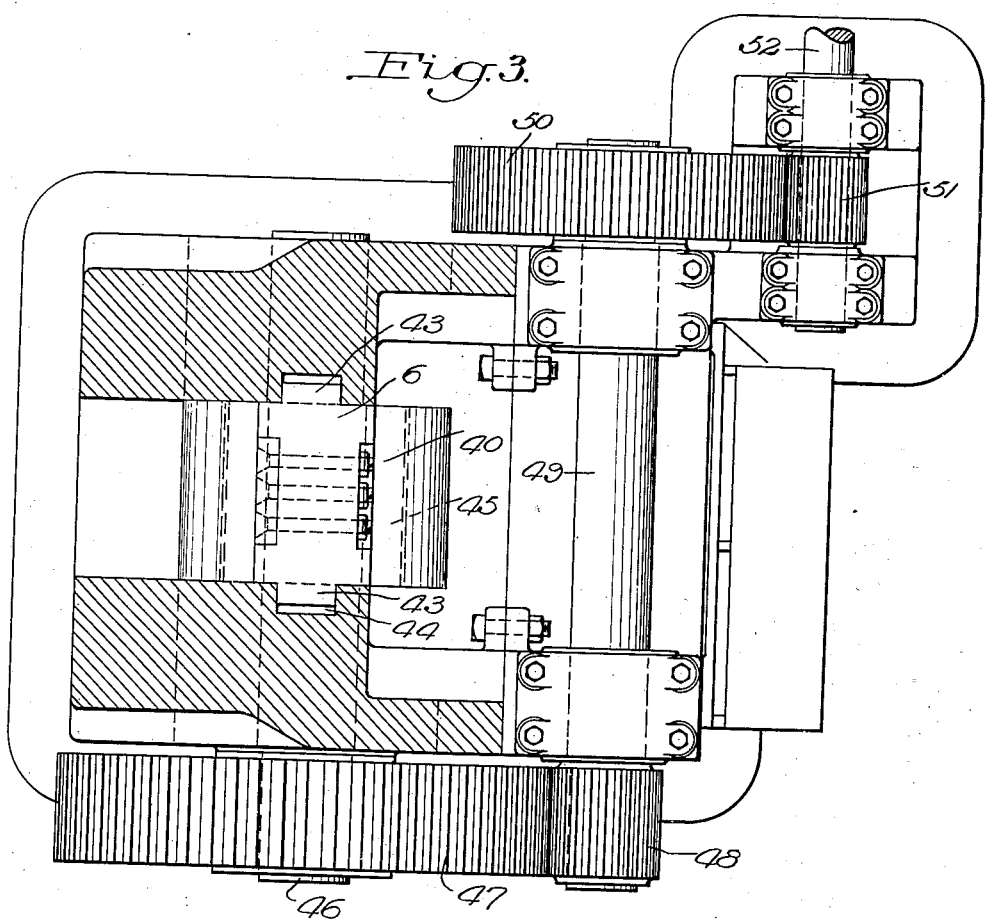
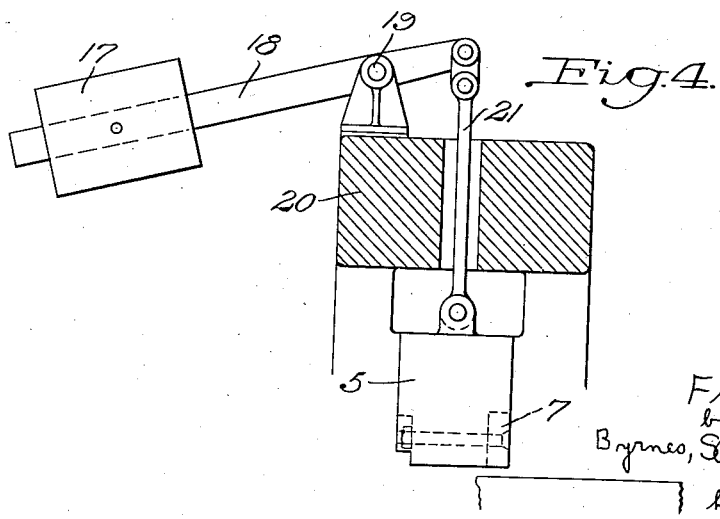
INVENTOR
Floyd A. Beatty
by Byrnes, Stebbins, Parmelee, & Blenko
his attorneys Patented May 7, 1935

2,000,314

UNITED STATES PATENT OFFICE 2,000,314

UP-CUT SHEAR

Floyd A. Beatty, Corliss Station, Pa., assignor to Lewis Foundry & Machine Company, Groveton, Pa., a corporation of Pennsylvania Application January 21, 1931, Serial No. 510,217

2 Claims. (Cl. 164—47)

My invention relates to an up-cut shear. More particularly my invention relates to an improved arrangement in up-cut shears operable to take care of different sizes of blooms and to change adjustment of the shears rapidly and accurately.

One object of my invention is to provide an up-cut shear having an adjustable upper shear which may be rapidly and accurately adjusted. A further object of my invention is to provide a yielding abutment which presses against the material being cut so as to push downwardly on the material during the return stroke of the lower shear.

In the drawings in which there is shown, not as limiting my invention but for the purpose of illustrating the same, one embodiment which the same may assume, Fig. 1 is a central vertical section through the up-cut shear;

Fig. 2 is a vertical section on line II—II of Fig. 1;

Fig. 3 is a horizontal section through the shear above the lower cutting element;

Fig. 4 is a detail view in central vertical section showing the counter-weight for the upper shear support.

Figure 1:
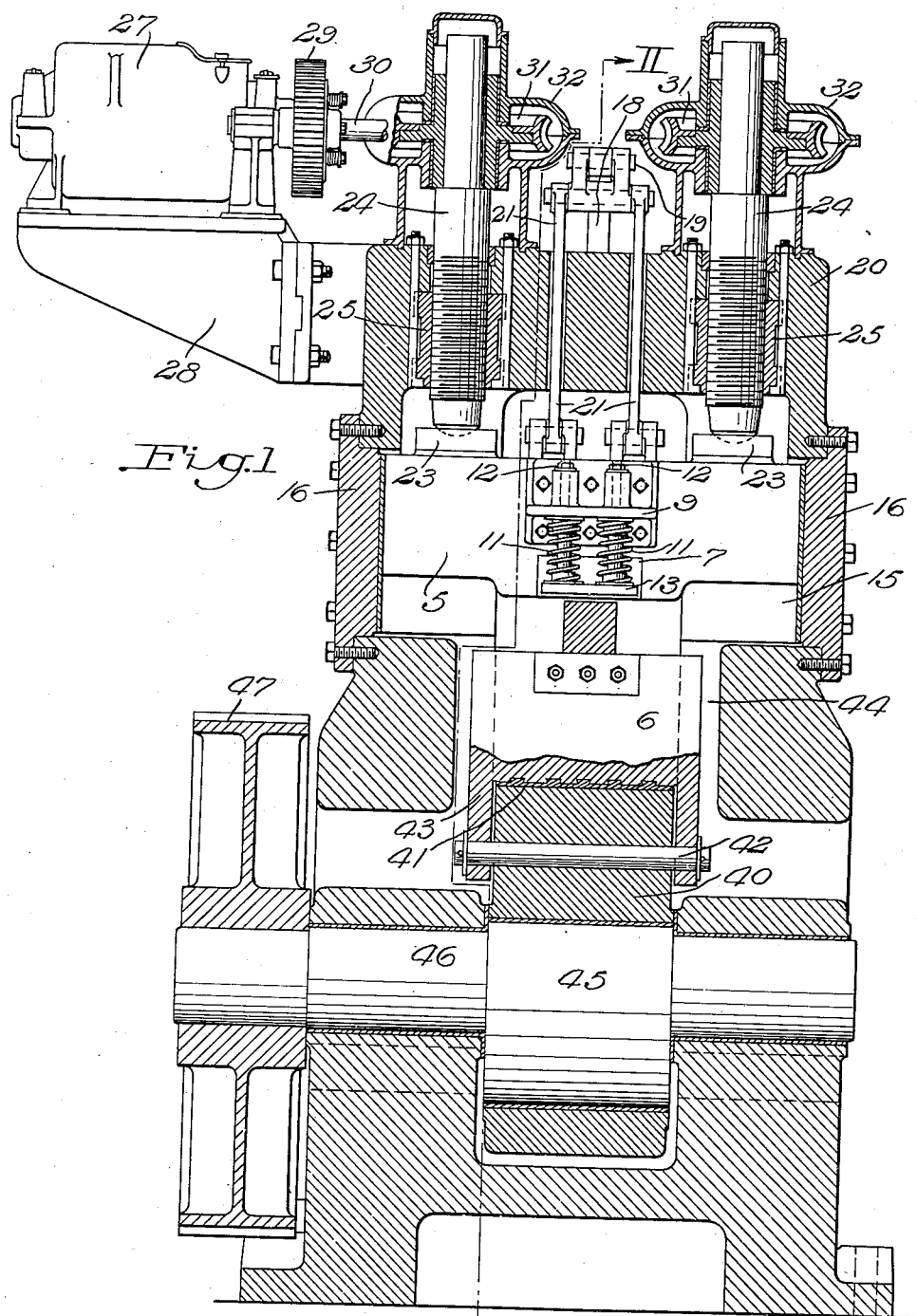

In the shearing machine shown in the drawings there are provided two opposed shear supports 5 and 6, the support 5 carrying the upper cutting element 7 and the support 6 carrying the lower cutting element 8. During a cutting operation, the upper support 5 remains stationary and the lower support 6 is reciprocated. Accordingly, the material which is being cut is lifted by the support 6. There is a tendency, due to the plastic character of the material at the time of shearing, for the end of the material which is lifted by the support 6 to become distorted and pushed out of line. I have provided yielding means for engaging the end of the material which is raised by the support 6; and accordingly, this means yields during the upward movement of the support 6 and presses downwardly on the end of the material during the return movement of the support 6. This compensates for the tendency of the movement of the support 6 to distort the material being cut.

In the particular embodiment shown, a support 9 projects laterally from the shear support 5, being secured thereto by bolts or the like. A plurality of bolts 10 extend slidably through the support 9, being vertically disposed. A plate or other abutment 13 is carried by the lower ends of the bolts 10; and springs 11 surround the bolts 10 so as to resiliently urge the abutment 13 downwardly. Nuts 12 on the upper ends of the bolts 10 adjust the compression of the springs 11. It is apparent, therefore, that when the support 6 forces the end of the material being cut to elevated position, the abutment 13 is engaged and lifted so as to compress the springs 11. As the support 6 is again lowered, the springs 11 elongate and press the material downwardly to urge the same into its original straight condition.

The upper shear support 5 is slidable between the inner faces of the four support members 15. The ends of the support 5 engage wear plates on the inner faces of closure members 16 bolted in place over the openings at the ends of the support 5. The weight of the shear support 5 is, as shown in Fig. 4, counter-balanced by a weight 17 carried by a lever 18. The lever 18 is pivoted at 19 to a support on the upper cross head 20, and is connected by links 21 to the upper shear support 5. The weight 17 more than balances the shear support 5 so that the latter would be rapidly moved upwardly were it not positioned by means of screws or the like carried by the upper cross head 20. Sockets 23 are provided on the top of the shear support 5 to receive the lower rounded ends of vertical positioning screws 24. The screws 24 threadedly engage inserts 25 in the upper cross head 20 and are adapted to be simultaneously rotated so as to simultaneously elevate or depress the two ends of the upper shear support 5. A motor 27 is supported on a bracket 28 extending laterally from the upper cross head 20. Suitable driving connections are provided between the motor 27 and the vertical screws 24. In the embodiment illustrated, the pinion on the motor 27 drives a gear 29 mounted on a worm shaft 30. Each screw 24 has splined thereon a worm wheel 31. Each worm wheel is held against longitudinal movement by a casing 32 carried by the upper cross head 20. Worms (not shown) on the worm shaft 30 engage the worm wheels 31 to simultaneously rotate the same when the motor 27 is driven. By controlling the motor 27, therefore, it is possible to rotate the positioning screws simultaneously in the same direction; and the shear support 5 is lowered if the motor is driven in one direction and raised if the motor is driven in the opposite direction. During a shearing operation, the inserts 25 take up the upward thrust of the shear support 5. During shifting of the shear support 5 by the screws 24, the lever 18 swings about its pivot 19 to permit the desired adjustment. Such adjustment may accordingly be rapidly accomplished to bring the cutting element 7 closely adjacent the top of the material which is to be cut. Accordingly, when a different size bloom is to be cut, the shear support 5 may be rapidly moved by driving the motor 27 in the proper direction; and the cutting elements 7 will be adjusted closely adjacent the top of the new size of bloom.

The lower shear support 6 is pivotally mounted on an eccentric 40. A bushing 41 (see Fig. 1) is held by interlocking projections to the arcuate bearing surface of the support 6. The axis of this bearing surface is the axis of a pin 42 which extends through the eccentric 40 and through downwardly projecting arms 43 on the two sides of the support 6. These arms 43 are vertically slidable in grooves 44 provided in the main frame of the shear. As the eccentric is moved in its orbit, the shear support 6 is reciprocated vertically, being held to a straight line path by the grooves 44. The eccentric 40 is pivoted to the support 6 by the pin 42, the bushing 41 permitting sliding movement at the surface of contact between the shear support 6 and the eccentric 40. The pin 42 is obviously limited to up and down movement and the rest of the eccentric must have an orbital movement.

The eccentric 40 is mounted on the eccentric portion 45 of the shaft 46. This shaft is driven through a suitable gear train, a portion of which is shown in Fig. 3. This gear train comprises a gear 47 on the shaft 46, a pinion 48 on a jack shaft 49 and a gear couple 50, 51. The gear 50 is secured to the shaft 49 and the gear 51 is driven by a power shaft 52. It is apparent, therefore, that the lower shear support 6 is vertically reciprocated by rotation of the power shaft 52.

As has been above pointed out, the upper shear support may be rapidly and accurately adjusted by proper operation of the motor 27. The provision of the yielding abutment 13 has the advantage that the material being cut is not left in a distorted condition. My improved actuating means for the lower shear support 6 has the advantage that there is a large bearing surface at 41 so that the powerful upward thrust of the eccentric 40 may be applied through the shear support 6 to cut the material. At the same time, the straight line vertical movement of the shear support 6 is ensured by the cooperation of the lateral arms 43 and the grooves 44.

While I have illustrated and described one specific form of shearing apparatus, it will be understood that the invention is not restricted to the particular construction and arrangement shown, but may be variously modified within the contemplation of the invention and under the scope of the following claims.

I claim:

1. In a shearing apparatus having upper and lower cutting elements for cutting metal articles into lengths, an upper shear support, a lower shear support and means for reciprocating said lower shear support comprising a shaft rotatably supported beneath said lower shear support having an eccentric portion, an eccentric mounted on said eccentric portion, the upper portion of said eccentric being formed with an arcuate bearing surface, and said lower shear support being formed with a cavity fitting over said arcuate bearing surface to provide a pivotal connection, and guiding means cooperating with said lower shear support to produce straight line movement of the same.

2. In shearing apparatus, the combination of an upper shear, a lower shear movable vertically relative to the upper shear to sever material, material supporting means for positioning a length of the material for severing into sections, the lower shear being engageable with the material so as to displace the end of the corresponding section relative to the remainder of said section and deform the section during the shearing operation, means for actuating said lower shear, and opposed straightening means engageable with said displaced end for pushing downwardly thereon and reshaping the section as the lower shear is lowered.

FLOYD A. BEATTY.